Nov. 23, 1971  G. McMILLAN  3,621,504
VEHICLE WASHING APPARATUS
Filed Feb. 13, 1970  5 Sheets-Sheet 1
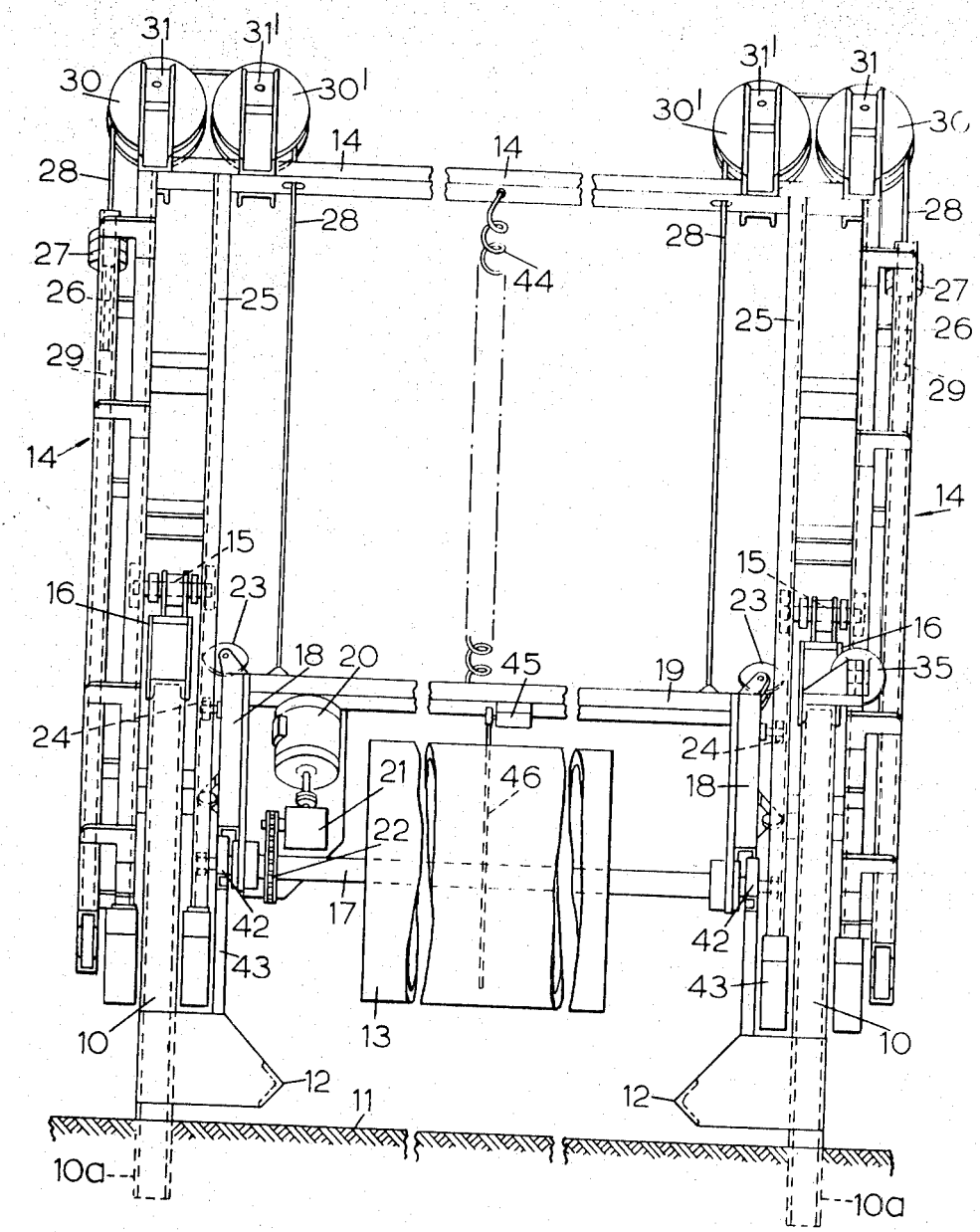
INVENTOR:
GILBERT McMILLAN
BY
Linton and Linton
ATTORNEYS

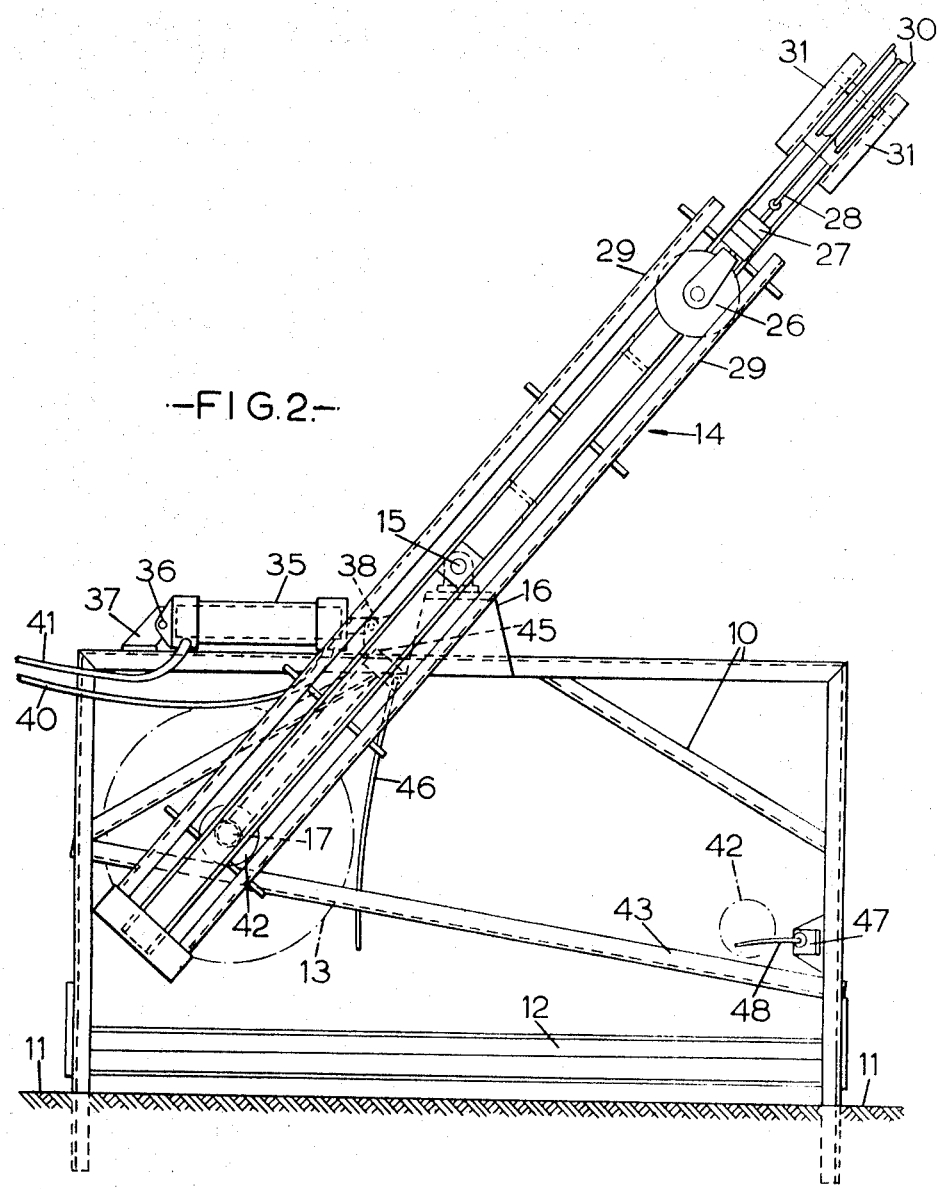

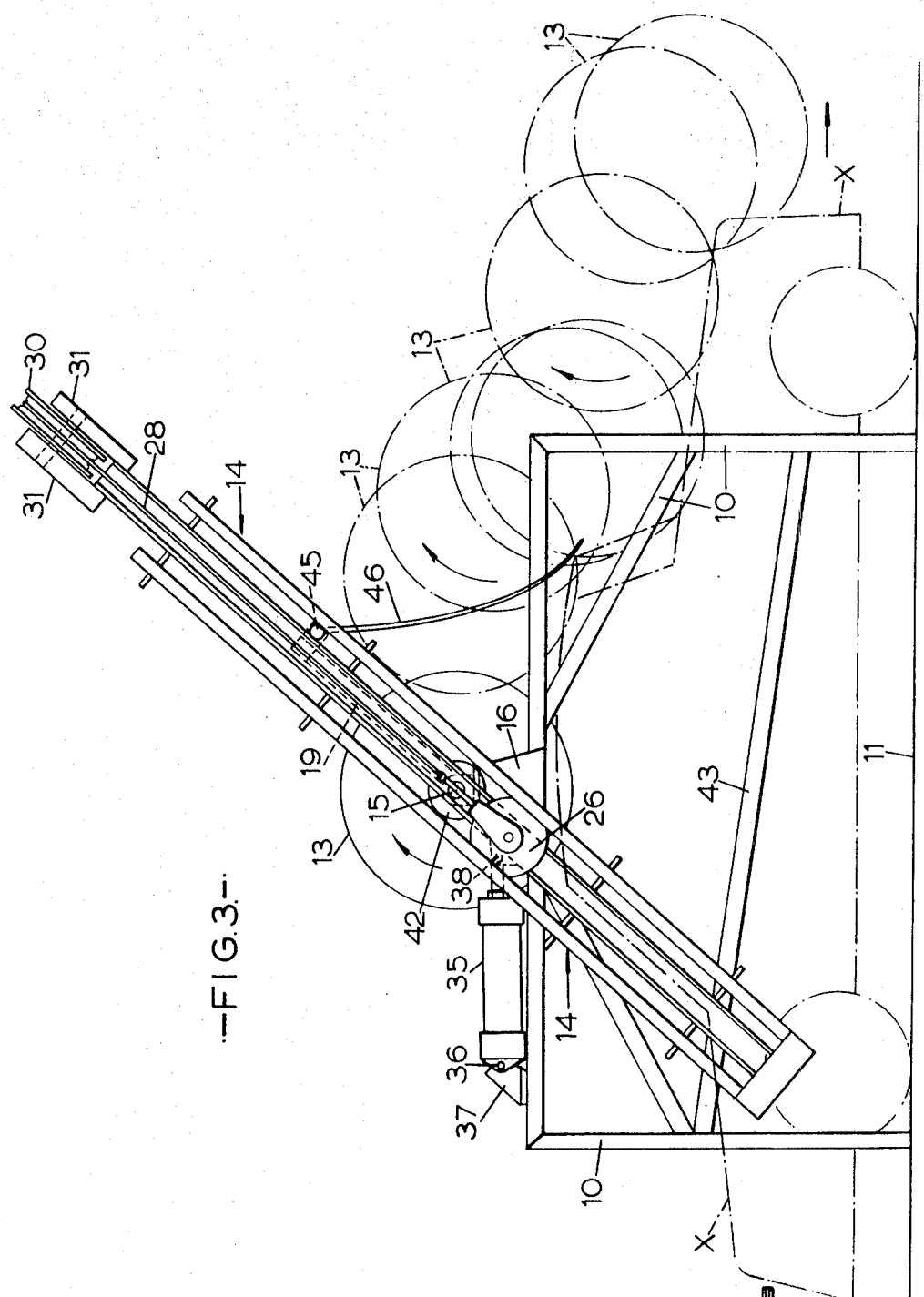

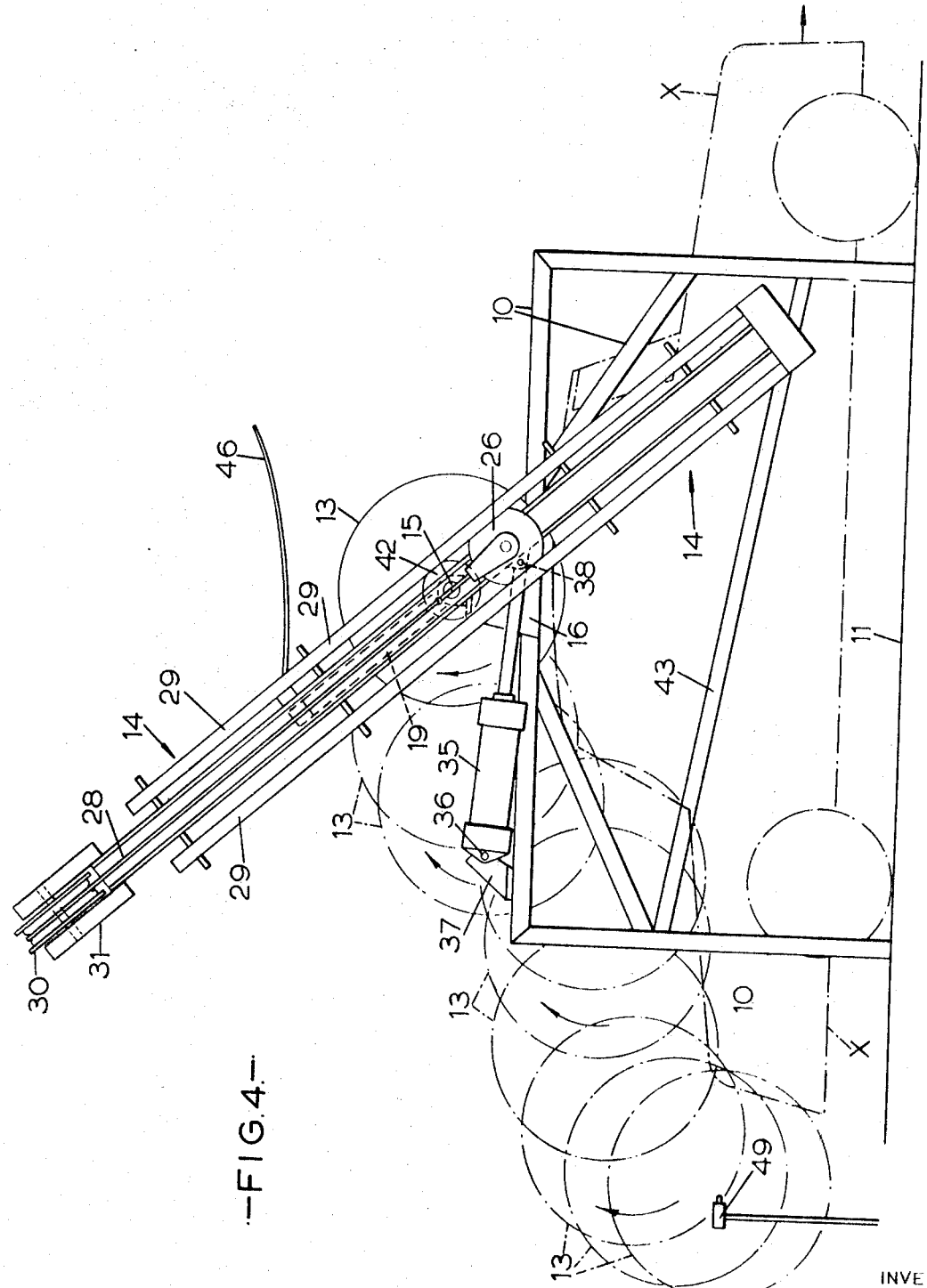

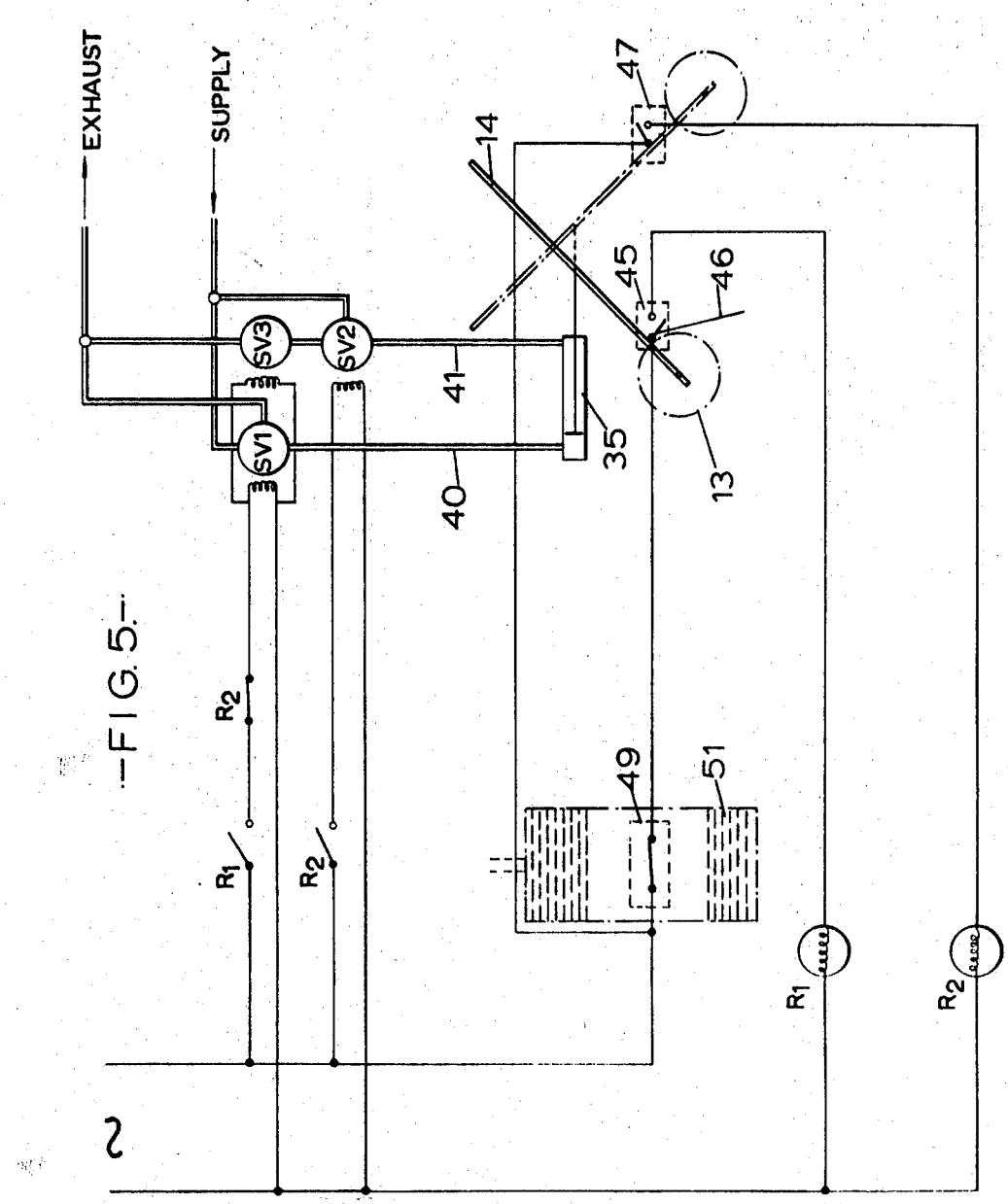

3,621,504
VEHICLE WASHING APPARATUS
Gilbert McMilan, 96 Hardy Mill Road, Harwood
Bolton, Lancashire, England
Continuation-in-part of application Ser. No. 738,055,
June 18, 1968. This application Feb. 13, 1970,
Ser. No. 11,080
Claims priority, application Great Britain, June 22, 1967,
28,866/67
Int. Cl. B60s 13/06
U.S. Cl. 15—21 D                                   8 Claims

ABSTRACT OF THE DISCLOSURE

Broadly, according to the invention, the apparatus is for supporting a horizontal, usually counterbalanced, brush of or for a vehicle washing apparatus and has means for guiding said brush firstly in a plane which is upwardly inclined with respect to the relative direction of movement of a vehicle and secondly in a reversely inclined plane.

---

This application is a continuation-in-part of application Ser. No. 738,055 filed June 18, 1968, and now abandoned.

This invention relates to vehicle washing apparatus, and more particularly, although of course not exclusively, to apparatus of the kind arranged to be energised, or to be operated, automatically on the insertion of a coin in a provided coin-receiving mechanism.

Such apparatus may be either of static or movable type. In the first instance, a vehicle to be cleansed is driven or moved through the apparatus, whilst in the second case a vehicle remains stationary whilst the washing means is moved over same.

Both kinds of apparatus basically comprise two, opposedly located, vertically arranged, rotary side brushes carried by pivotal frames and biased towards inwards positions, and a horizontal rotary brush which is vertically displaceable. The arrangement is such that when a vehicle is moved through the apparatus, or conversely the apparatus is moved over a vehicle, the rotary brushes thereof, aided by a supply of washing liquid, function to cleanse the vehicle.

Such apparatus is known, and whilst relatively efficient in use, has a disadvantage in that the front and rear surfaces of a vehicle are difficult to cleanse effectively due primarily to the limited, usually arcuate, permitted movements of the brush elements. This disadvantage is particularly evident in the case of vehicles which have vertical or reversely inclined, front and rear surfaces.

The present invention has for its primary object to provide improved means for guiding the horizontal rotary brush element or elements of vehicle washing apparatus of the kind referred to whereby a more effective cleansing of a vehicle may be effected irrespective of the inclinations of its front and rear surfaces. A further object is to provide such apparatus which will deal effectively with a greater variety of vehicles than heretofore. A still further object is to provide apparatus which is less liable to damage projecting vehicle accessories than heretofore.

According to one mode of embodiment, apparatus for supporting the rotary horizontal brush of vehicle washing apparatus, comprises a frame mounted so as to be pivotal about a horizontal axis, guide means on said frame for supporting said horizontal rotary brush said brush being movable upwards and downwards within said guides, and means for moving said pivotal frame from a first position, which is upwardly inclined with respect to the relative direction of movement of a vehicle being washed, to a reversely inclined position.

Thus arranged, said brush is caused first to travel up the front (or approaching surface) of a vehicle moved thereagainst, or against which the brush is urged, by reason of the upwardly inclined nature of its guide means and effectively acts upon the frontal surfaces of the vehicle. When the brush commences to descend, it is constrained to follow, by pivotal movement of its support frame, a reversed, downwardly inclined, travel path and thereby remains in operative contact with the rear (or receding) surfaces of the vehicle even although such surfaces are vertical or reversely inclined.

The invention is further described with the aid of the accompanying explanatory drawings which illustrate, by way of example only and not of limitation, one mode of embodiment.

In said drawings:

FIG. 1 is a front elevation of apparatus according to the invention for supporting and guiding the horizontal rotary brush of vehicle washing apparatus, and FIG. 2 is a side elevation thereof.

FIGS. 3 and 4 are schematic views, similar to that of FIG. 2, but illustrating the upward and downward dispositions of the rotary brush during use.

FIG. 5 is a diagram illustrating an electrical circuit incorporating limit switches controlling operation of the apparatus.

Referring to said drawings, the numeral 10 generally denotes a pair of side frame structures, the lower ends 10a whereof are embedded in a concrete or other floor 11, and which carry guide means 12 whereby a vehicle driven therebetween in a washing operation is constrained to follow a required path relative to a horizontal rotary brush 13 carried by a frame generally designated 14 which is pivoted about a horizontal axis in bearings 15 of brackets 16 mounted on said side frame structures 10.

The brush 13, which may be of any suitable construction commensurate with the purpose intended, is mounted so as to rotate with a shaft 17 journalled in bearings of arms 18 of a sub-frame 19, and is adapted to be driven from an electro-motor 20, carried by said frame 19, through a gear box 21 and a chain drive 22 (FIG. 1).

Said sub-frame 19 is fitted at each side with guide wheels or rollers 23, 24 which are engaged within and run on guides 25 provided at each side of the frame 14, and the weight of said frame 19 and the brush assembly 13 is to a large extent counterbalanced by a weight 26 and guide wheels 27 connected to the frame 19 by flexible connectors 28. The guide wheels 27 run between guides 29 also carried by the frame 14, and the flexible connectors 28 run over pulleys 30, 30' journalled in bearing brackets 31, 31' mounted on the upper part of the frame 14.

The frame 14 is arranged so as to be angularly displaced about its horizontal axis from the position shown in FIGS. 2 and 3 to that shown in FIG. 4, by means of a fluid-operable, e.g. hydraulic, double-acting power cylinder 35. Said cylinder 35 is pivotally anchored at 36 to a bracket 37 secured to the adjacent side frame 10, and the piston or cylinder thereof is pivotally connected with the pivotal frame 14 at 38, and working fluid is supplied thereto and exhausted therefrom via flexible pipe lines 40, 41. If required, a power cylinder as 35 may be provided in respect of each side of the frame 14.

Also carried by the shaft 17 of the brush 13 are guide wheels 42 arranged so as to run as hereinafter described on guide rails 43 carried by the side frames 10.

The numeral 44 denotes a flexible and extendible pipe line for supplying washing liquid to spray pipes or nozzles (not shown) carried by the sub-frame 19.

For controlling the operation and pivotal movement of the frame 14 under the influence of the power cylinders 35 there is provided an electrical relay circuit hereafter described incorporating a limit switch 45 carried by the sub-frame 19 and adapted for operation by a vehicle contacting an actuating rod 46, and a second switch 47 with an actuating rod 48 mounted on one of the side frames 10 adjacent the lower end of the track 43. The switch 45 operates in circuit with a further switch 49 (FIGS. 3 and 4) operated by an arm 50 and which is associated with vertical side brushes (indicated at 51 in FIG. 5) of the apparatus which function in known manner to operate upon the sides of a vehicle driven therebetween.

In use of the apparatus, and assuming power has been applied to the electro-motor 20, washing liquid to the pipe line 44, and a working medium to the power cylinders 35, a vehicle X (FIGS. 3 and 4) to be washed is driven slowly between the rotary side brushes of the apparatus which function in known manner, and thereafter between the guide rails 12, 12 carried by the side frames 10. Said guides 12 usually will be continuations of guides provided in respect of the vertical side brushes.

Initially, the brush 13 is in the position shown in FIG. 2 in broken lines, but when the front of the vehicle is urged thereagainst, said brush—in continued movement of the vehicle—by reason of the inclination of the guides 25, and aided by the counterweights 26, 27 travels up the guides 25 maintaining intimate contact with the frontal surfaces of the vehicle. The broken lines (FIG. 3) indicate the positions of the brush 13 relative to the vehicle as the brush is moved upwards within the guides 25. When said brush reaches the position shown in full lines in FIG. 3, the actuating rod 46 of the limit switch 45 is displaced by the front edge of the roof of the vehicle, and moves to the position shown in FIG. 4 whereby, when the vehicle clears the arm 50 of the switch 49 (FIG. 3), the power cylinder 35 is caused to operate and pivot the frame 14 to the position shown in FIG. 4.

In the case of large vehicles, the switch 45 may be operated by the front of the vehicle if said front is high enough, but in such circumstances the switch 49 will be maintained open by the vehicle at least until the roof of the vehicle is reached by the rod 46 of switch 45 whereby reverse movement of the pivotal frame 14 occurs normally when the brush 13 is operating upon the roof of the vehicle.

During the downward, gravitational, inclined travel path of the brush 13 as defined by the guides 25, and as the vehicle continues its forward movement, the brush 13 is maintained in close contact with the rear surfaces as indicated in FIG. 4 in broken lines.

The electrical control circuit embodying the switches 45 and 49 is so arranged that operation of switch 45 does not affect actuation of the cylinder 35 until switch 49 is closed, i.e. until the vehicle has cleared the arm 50.

Referring to FIG. 5 of the drawings, the before referred to limit switches 45 and 47 normally are open, and the limit switch 49 normally is closed. SV1 and SV2 denote three-way solenoid-operated valves located as shown in the fluid flow lines 40, 41 of the power cylinder 35, said valves being normally open to exhaust. SV3 is a normally closed two-way solenoid-operated valve in the fluid flow line 41. R1 and R2 are relays for operating said solenoid valves. It will be seen that when a vehicle to be washed is in a position such that it is clear of switch 49 and actuates the switch 45, i.e. both switches are closed, the relay R1 will be energized thereby to operate valves SV1 and SV3 whereby the power cylinder 35 pivots the frame 14 to its reversed position (shown in broken lines). The brush 13 is thus positioned for operating upon the rear of a vehicle. When said brush 13 reaches its lowermost position and the vehicle is clear of the apparatus, switch 47 is closed by said brush, energising relay R2 whereby valves SV1 and SV3 are reversed, and valve SV2 functions to supply working fluid to the other side of the power cylinder 35. The frame 14 is thus pivoted back to its starting position with the brush 13 positioned for operating upon the front of a vehicle.

When the brush 13 reaches its lowermost point, the wheels 42 carried by the brush shaft 17 rest upon the lower parts of the tracks 43, in the position indicated in broken lines in FIG. 2, and in this position, when the vehicle is clear of the apparatus, the switch 47 is actuated whereby the power cylinder 35 is reversely operated to pivot the frame 14 back to its starting position. In this movement the tracks 43 serve to maintain the brush 13 clear of the floor 11 and to position same on said track 43 at a height suitable for operating upon a subsequent vehicle.

It will of course be seen that apparatus as described may be of static nature as herein more particularly described, or of a mobile nature, i.e. is supported by a traveling frame or gantry arranged so as to move over a stationary vehicle to effect a washing operation.

It will also be seen that apparatus according to the invention provides simple but effective means of supporting and guiding a horizontal, rotary brush of vehicle washing apparatus so that the front, top and rear surfaces of a vehicle will be closely followed by the brush and effectively cleansed irrespective of the inclinations of the surfaces. Further, it can be arranged and dimensioned so as to suit all vehicles up to and including doubledecked passenger vehicles.

If desired, the direction of rotation of the brush 13 may be reversible as and when required whereby its rotary motion may be employed to facilitate movement of the brush upwards and downwards over the surfaces to be cleaned.

I claim:

1. Apparatus for supporting a horizontal rotary brush of a vehicle washing apparatus, comprising a frame pivotally mounted about a horizontal axis, a driven horizontally positioned brush, a counterbalanced subframe rotatably supporting said horizontal brush, guide means on said frame for guiding said counterbalanced sub-frame, said sub-frame being movable upwards and downwards within said guide means, power means for moving said pivotal frame from a starting position, which is upwardly inclined with respect to the relative direction of movement of a vehicle being washed, to a reversely inclined position, and means for controlling operation of said power means.

2. Apparatus for supporting a horizontal rotary brush of vehicle washing apparatus, as claimed in claim 1, including means for driving said rotary brush carried by said sub-frame.

3. Apparatus for supporting a horizontal rotary brush of vehicle washing apparatus, as claimed in claim 1, including second guide means on said frame, means slidable in said second guides counterbalancing means slideable in said second guides counterbalancing said sub-frame and brush and flexible connectors connecting said counterbalance means and said sub-frame, pulleys carried at the upper end of said pivotal frame, and having said flexible connectors extending thereover.

4. Apparatus for supporting a horizontal rotary brush of a vehicle washing apparatus, as claimed in claim 1, including a shaft for said brush, rollers on said shaft, side frames supporting said pivotal frame and said side frames comprise guide tracks for co-operating with said rollers carried by the shaft of said brush and which guide tracks are arranged so as to maintain said brush clear of the ground during the return movement of said pivotal frame to its starting position.

5. Apparatus for supporting a horizontal rotary brush of vehicle washing apparatus, as claimed in claim 4, wherein said power means for moving said pivotal frame from one inclined position to a reversely inclined position comprises a fluid-operable power cylinder.

6. Apparatus for supporting a horizontal rotary brush of vehicle washing apparatus, as claimed in claim 5, including limit switches carried by the sub-frame and arranged for actuation by a vehicle being washed for operating said power cylinder.

7. Apparatus for supporting a horizontal rotary brush of vehicle washing apparatus, as claimed in claim 6, wherein a limit switch is mounted adjacent the lower end of the guide tracks carried by said side frames for controlling the return movement of said pivotal frame to its starting position.

8. Apparatus for supporting a horizontal rotary brush of vehicle washing apparatus, comprising a pair of side frames, bearings in said side frames, a frame pivotal about a horizontal axis in said bearings of said side frames, first guides provided at each side of said pivotal frame, a sub-frame movable in said guides bearings on said sub-frame, said horizontal rotary brush being journalled in said bearings of said sub-frame, an electric motor carried by said sub-frame for driving said rotary brush, a source of electrical current connected to said electric motor, second guides provided on said pivotal frame, counterbalance means movable in said second guides, flexible connectors operably connecting said counterbalance means with said sub-frame, at least one fluid-operable power cylinder for displacing said pivotal frame from one angle of inclination to a reversed angle of inclination, a source of fluid under pressure for said fluid-operable power cylinder, two limit switches operatively connected to said source of fluid and actuable by contact with a vehicle being washed for supplying fluid to and causing said fluid operable power cylinder to move said pivotal frame from said one angle of inclination to said reversed angle of inclination, and a third limit switch operatively connected to said source of fluid and operable by said horizontal brush for supplying fluid to said fluid operable power cylinder and moving said pivotal frame from said reversed angle of inclination back to said one angle of inclination.

References Cited
UNITED STATES PATENTS

| | | | |
|---|---|---|---|
| 2,610,342 | 9/1952 | Griffiths | 15—21 D |
| 2,881,459 | 4/1959 | Emanuel | 15—21 D |

EDWARD L. ROBERTS, Primary Examiner